United States Patent
Takemoto et al.

(10) Patent No.: US 8,877,403 B2
(45) Date of Patent: Nov. 4, 2014

(54) DRAINAGE SYSTEM FOR FUEL CELL

(75) Inventors: Shinichiro Takemoto, Yokohama (JP);
Tsutomu Yamazaki, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1428 days.

(21) Appl. No.: 12/243,251

(22) Filed: Oct. 1, 2008

(65) Prior Publication Data

US 2009/0087699 A1 Apr. 2, 2009

(30) Foreign Application Priority Data

Oct. 2, 2007 (JP) .................................. 2007-258829

(51) Int. Cl.
*H01M 8/04* (2006.01)

(52) U.S. Cl.
CPC ............ *H01M 8/04164* (2013.01); *Y02T 90/32* (2013.01); *Y02E 60/50* (2013.01); *H01M 8/04223* (2013.01); *H01M 2250/20* (2013.01); *H01M 8/04253* (2013.01)
USPC .......................................... 429/450; 429/429

(58) Field of Classification Search
None
See application file for complete search history.

(56) References Cited

U.S. PATENT DOCUMENTS

| 6,489,048 B1* | 12/2002 | Ernst et al. ..................... 429/413 |
| 2004/0229098 A1 | 11/2004 | Fujita |
| 2005/0285608 A1* | 12/2005 | Sato et al. ..................... 324/663 |

FOREIGN PATENT DOCUMENTS

| JP | 61-67522 | 5/1986 | |
| JP | 5-041234 | 2/1993 | |
| JP | 2004-288486 | * 10/2004 | ............. H01M 8/06 |
| JP | 2005-294197 | 10/2005 | |
| JP | 2006-140044 | 6/2006 | |
| JP | 2007-87718 | 4/2007 | |
| JP | 2007 115485 | 5/2007 | |
| JP | 2007-207556 | 8/2007 | |
| WO | WO 00/65676 | 11/2000 | |

OTHER PUBLICATIONS

IPDL Machine translation of JP 2007-207556 printed Oct. 23, 2011.*
Machine translation of JP 2004-288486.*

* cited by examiner

*Primary Examiner* — Maria J Laios
(74) *Attorney, Agent, or Firm* — Drinker Biddle & Reath LLP

(57) ABSTRACT

A drainage system for a fuel cell, including a gas-liquid separator configured to separate fuel gas and liquid water from a gas-liquid mixture discharged from the fuel cell, a water tank configured to receive the liquid water separated by the gas-liquid separator, a drain valve in fluid communication with the water tank, the drain valve configured to selectively discharge the liquid water from the water tank, and a control unit configured to selectively open and close the drain valve. The water tank includes a lower portion having a first horizontal cross sectional area and an upper portion having a second horizontal cross sectional area, the first horizontal cross sectional area being smaller than the second horizontal cross sectional area. The control unit opens and closes the drain valve to maintain a first water level within the upper portion of the water tank when the fuel cell is in an operating state and to maintain a second water level within the lower portion of the water tank when the fuel cell is in a stopped state.

9 Claims, 7 Drawing Sheets

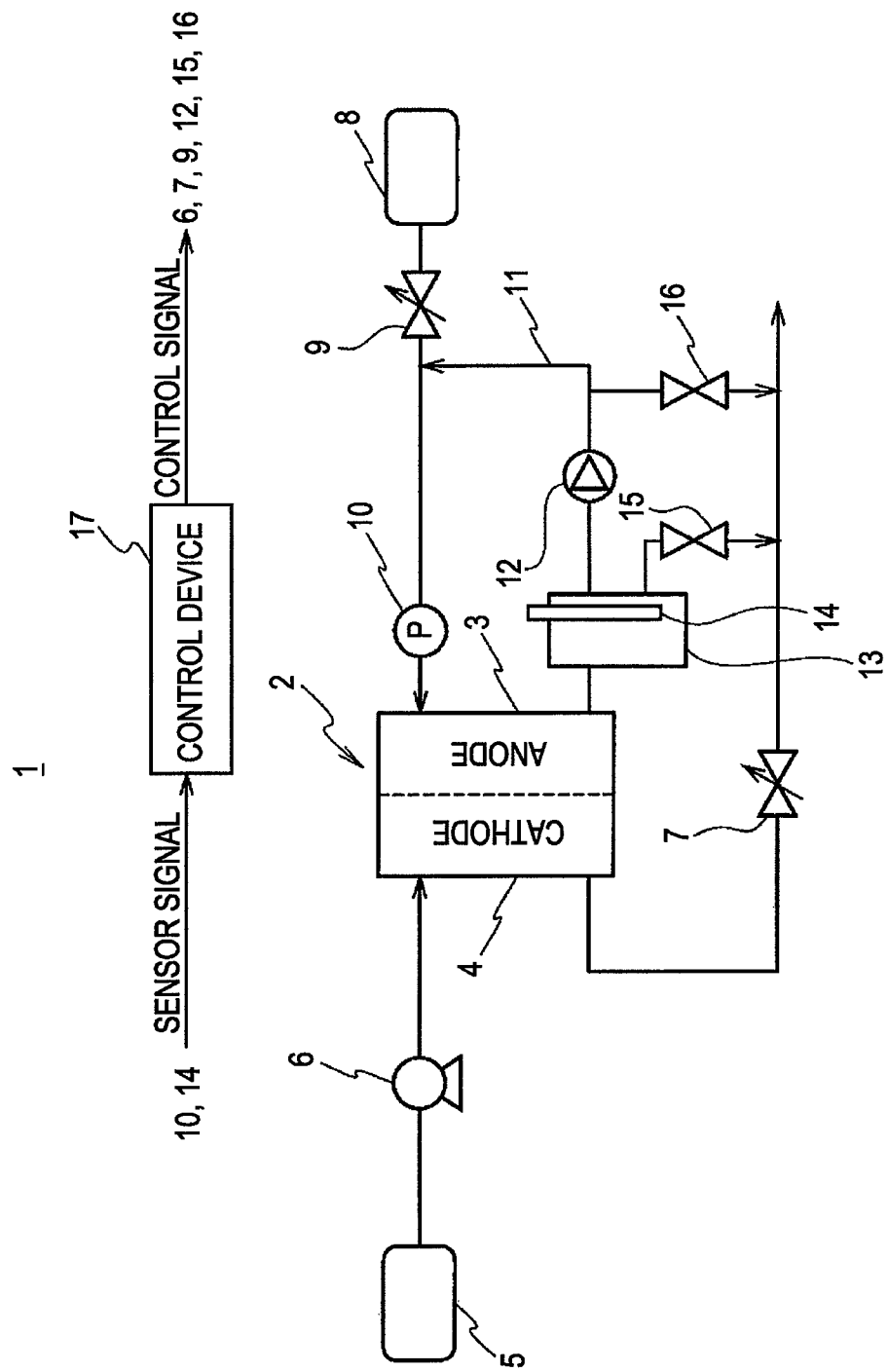

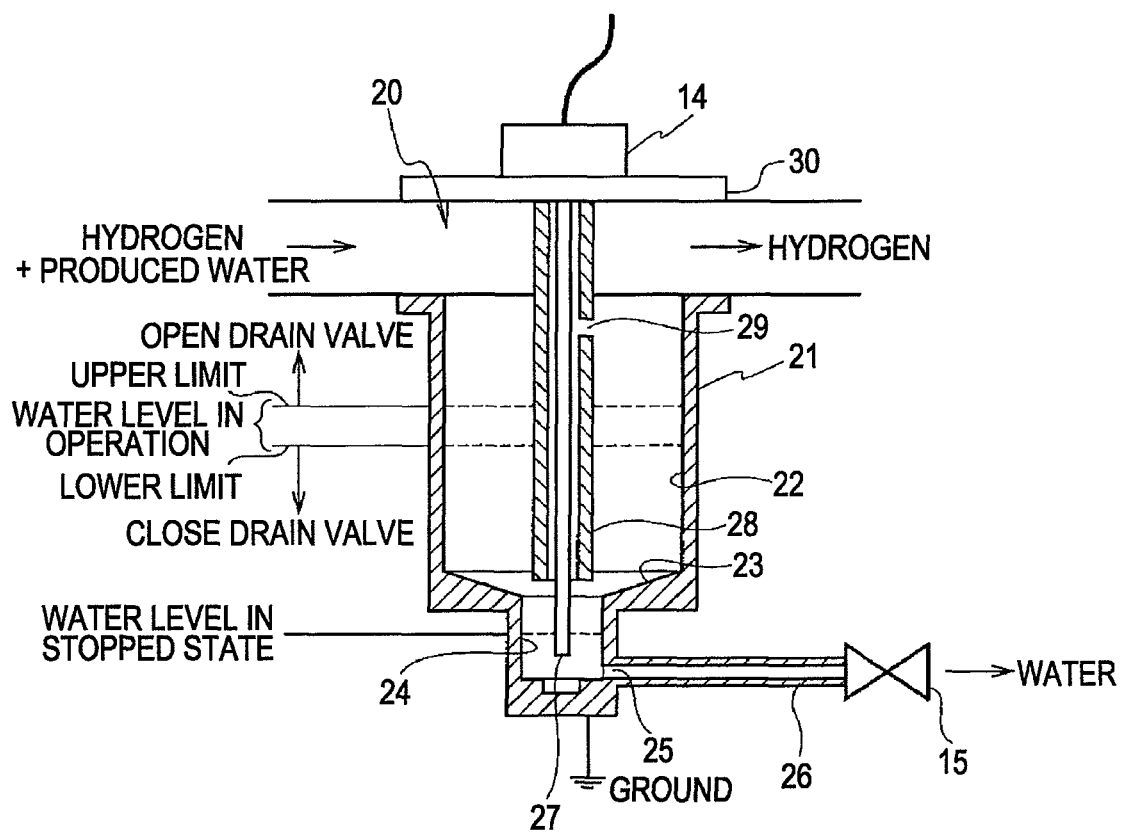

DRAINAGE SYSTEM FOR FUEL CELL

This application claims priority under 35 U.S.C. §119 to Japanese Patent Application No. 2007-258829, filed on Oct. 2, 2007, which is incorporated by reference herein in its entirety.

FIELD OF THE INVENTION

The present invention relates generally to a drainage system for a fuel cell which controls drainage from a water tank.

BACKGROUND OF THE INVENTION

A fuel cell system which circulates fuel gas includes a gas-liquid separator in a fuel gas circuit because the fuel gas discharged from a fuel electrode is mixed with generated water. The gas-liquid separator separates the liquid water from the gas component so that only the gas component is fed to the fuel electrode again. In the process of discharging the water separated from the fuel gas to the outside of the system, the separated water is temporarily stored in a tank. Thus, water constantly exists in a discharge section and blocks the fuel gas channel from the outside, thereby preventing the flammable fuel gas from being discharged to the outside in the drainage process.

If, for example, a fuel cell vehicle is parked in sub-zero temperatures and water in the tank freezes, it becomes necessary to melt the ice in the tank. The water cannot be discharged until the ice is melted. Therefore, in the case where the time required for melting the ice is long, there is a possibility that the generated water will overflow from the tank if, for example, the output of the fuel cell is set to a high level immediately after the activation thereof. In such a case, gas-liquid separation cannot be performed and fuel gas necessary for power generation cannot be supplied to the fuel electrode. As a result, power generation cannot be performed. Therefore, a warm up operation of the fuel cell is performed until the ice is completely melted and the vehicle cannot be started until after the ice is completely melted.

A method for reducing the time required for melting the ice in the tank to allow the vehicle to be started in a shorter time is proposed in the related art. Heat sources are placed on the exterior of and interior of the tank, and the ice in the tank can be heated from both the inside and outside.

The above-described method of the related art has the following disadvantage. That is, there may be a case where the ice at positions where the heaters are placed can be rapidly melted, whereas the time required for melting the ice at positions other than the positions where the heaters are placed is still long. If the vehicle is started in such a state, the water level largely varies in accordance with the amount of water that flows into and out of the tank. Therefore, it is still difficult to control the water drainage from the tank and it is difficult to start the vehicle in a short time.

An object of the invention to overcome the above-describe disadvantage of the related art.

SUMMARY OF THE INVENTION

In an embodiment, the invention provides a drainage system for a fuel cell, including a gas-liquid separator configured to separate fuel gas and liquid water from a gas-liquid mixture discharged from the fuel cell, a water tank configured to receive the liquid water separated by the gas-liquid separator, a drain valve in fluid communication with the water tank, the drain valve configured to selectively discharge the liquid water from the water tank, and a control unit configured to selectively open and close the drain valve. The water tank includes a lower portion having a first horizontal cross sectional area and an upper portion having a second horizontal cross sectional area, the first horizontal cross sectional area being smaller than the second horizontal cross sectional area. The control unit opens and closes the drain valve to maintain a first water level within the upper portion of the water tank when the fuel cell is in an operating state and to maintain a second water level within the lower portion of the water tank when the fuel cell is in a stopped state.

In another embodiment, the invention provides a method of controlling liquid water drainage for a fuel cell, including separating fuel gas and liquid water from a gas-liquid mixture discharged from the fuel cell with a gas-liquid separator, receiving the liquid water separated by the gas-liquid separator in a water tank, the water tank including a lower portion having a first horizontal cross sectional area and an upper portion having a second horizontal cross sectional area, the first horizontal cross sectional area being smaller than the second horizontal cross sectional area, and selectively opening and closing a drain valve with a control unit to maintain a first water level within the upper portion of the water tank when the fuel cell is in an operating state and to maintain a second water level within the lower portion of the water tank when the fuel cell is in a stopped state.

According to an embodiment of the present invention, the first horizontal cross sectional area of the water tank at the lower portion thereof is set to be smaller than the second horizontal cross sectional area of the water tank at the upper portion thereof. The control unit opens and closes the drain valve so that the water level is maintained at the first level within the upper portion of the water tank when the fuel cell is in the operational state, and so that the water level is maintained at the second level within the lower portion of the water tank when the operation of the fuel cell is in the stopped state. Thus, when the operation of the fuel cell is stopped, the water level is maintained at the second level within the lower portion of the water tank that has a small volume and a small cross sectional area. Therefore, even if the water in the water tank freezes and ice is generated, the amount of the ice formed within the water tank is small. Therefore, the time required for melting the ice can be minimized and the draining process can be started quickly. As a result, the vehicle can be started in a short time.

In addition, the drain valve is controlled such that the water level is maintained at the first level within the upper portion while the fuel cell is in the operational state. Therefore, when, for example, the output level of the fuel cell is high and a large amount of generated water that is separated from the fuel gas suddenly flows into the water tank, the water can be prevented from overflowing from the water tank and the operation can be continued while the gas-liquid separation function is maintained.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1 is a system diagram illustrating an embodiment of the structure of a fuel cell system including a drainage system for a fuel cell according to an embodiment of the present invention;

FIG. 3 is a sectional view illustrating a drainage system according to a second embodiment;

DETAILED DESCRIPTION OF THE PREFERRED EMBODIMENTS

Figure 2A:
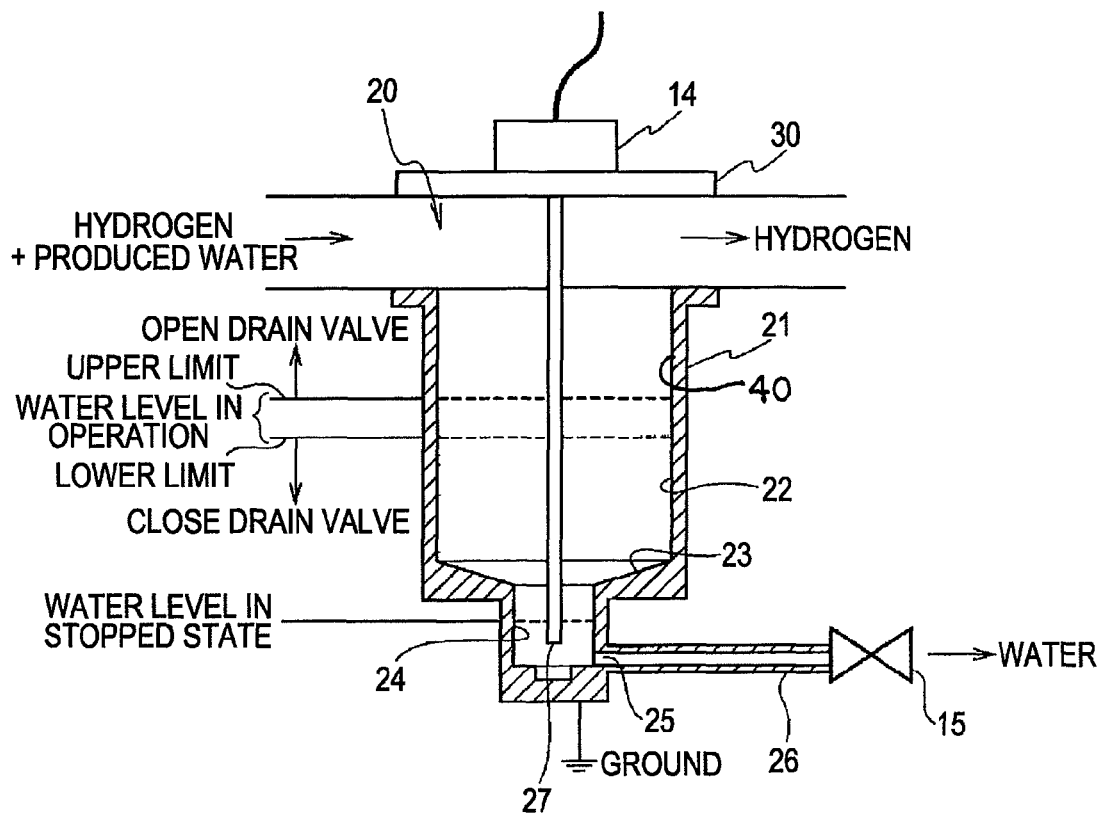
FIG. 2A is a sectional view illustrating a drainage system according to a first embodiment.

Embodiments of the present invention will be described in detail below with reference to the drawings. Drainage systems according to the embodiments described below are suitable for use in a fuel cell of a fuel cell vehicle. However, the use of the drainage systems is not particularly limited to fuel cells.

First Embodiment

FIG. 1 is a system diagram illustrating an embodiment of the structure of a fuel cell system including a drainage system for a fuel cell according to an embodiment of the present invention. Referring to FIG. 1, a fuel cell system 1 includes a proton exchange membrane fuel cell stack 2 having an anode (fuel electrode) 3 and a cathode (oxidant electrode) 4.

Air, which functions as oxidant, is drawn into a compressor 6 through an air inlet 5 and is compressed. The compressed air is supplied to the cathode 4. Some of the supplied air is subjected to reaction at the cathode 4, and the remaining air is discharged out of the system after the pressure thereof is adjusted by an exhaust control valve 7. Hydrogen, which functions as fuel gas, is stored in a fuel gas tank 8 at a high pressure. The high-pressure hydrogen in the fuel gas tank 8 is supplied to the anode 3 after the pressure thereof is controlled by a hydrogen regulating valve 9 and measured by a pressure gage 10. Unreacted fuel gas, which is mixed with liquid water generated by the reaction, is discharged from the anode 3, is cycled through a fuel gas circuit 11, and is fed to the anode 3 again. A gas-liquid separator 20 is placed in the fuel gas circuit 11 to receive the fuel gas which is discharged from the anode 3 and has become mixed with the liquid water generated by the reaction, and the gas-liquid separator 20 separates the fuel gas from the liquid water. The fuel gas separated by the gas-liquid separator 20 is pressurized and conveyed by a fuel gas blower 12 in the fuel gas circuit 11, mixed with fresh hydrogen gas supplied from the hydrogen regulating valve 9, and is supplied to the anode 3. A purge valve 16 is disposed downstream of the fuel gas blower 12 in the fuel gas circuit. When impurities accumulate in the anode 3 or in the fuel gas circuit 11, the purge valve 16 is opened to discharge the impurities out of the system.

In the fuel cell stack 2, oxygen included in the air and the hydrogen gas react with each other to generate electricity and water. Water that is mixed with the cathode exhaust can be discharged through the exhaust control valve 7 together with the cathode exhaust. However, water that is mixed with the fuel gas must be separated from the fuel gas before being discharged, and the fuel gas must be prevented from being discharged together with the water. Therefore, the gas-liquid separator 20 is provided in a drainage system 13 to separate the fuel gas and the water from each other.

As described below, the drainage system 13 includes a gas-liquid separator 20, a water tank 21, a water level sensor 14, and a drain valve 15. The drain valve 15 is controlled such that the water level is maintained between an upper limit and a lower limit while the fuel cell is in normal operation.

A control device 17 controls the overall operation of the fuel cell system 1 and the water level in the water tank 21 by opening and closing the drain valve 15 on the basis of a water level signal obtained by the water level sensor 14. In the present embodiment, the control device 17 is a microprocessor including a CPU, a program ROM, a working RAM, and an input/output interface. However, the control device 17 is not particularly limited to this embodiment.

Figure 2B:
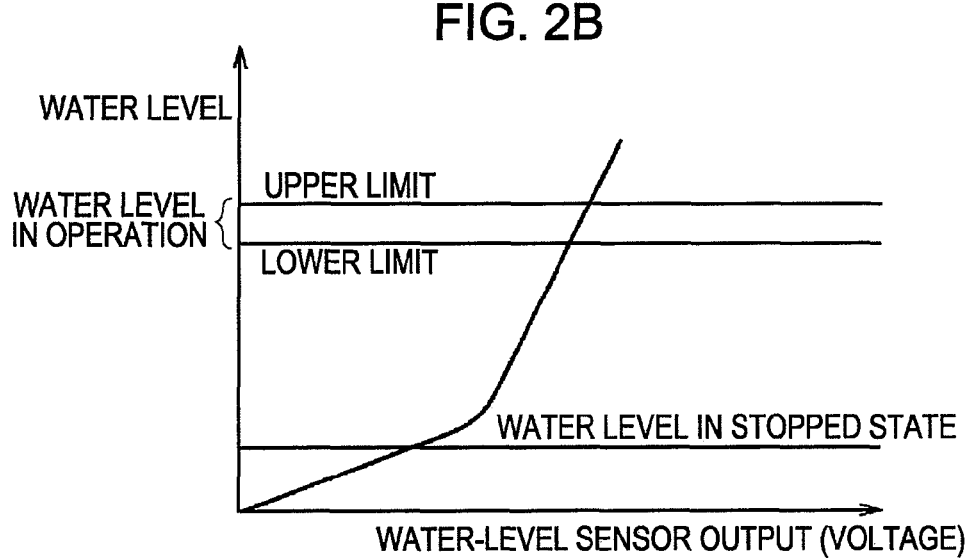
FIG. 2B is a graph illustrating the relationship between the water level and the water-level-sensor output voltage according to the first embodiment.

Next, the detailed structure of the gas-liquid separator 20 according to the present embodiment and water level control performed by the gas-liquid separator 20 will be described with reference to FIGS. 2A and 2B. FIG. 2A is a sectional view illustrating the gas-liquid separator 20 according to the first embodiment. FIG. 2B is a graph illustrating the relationship between the water level (vertical axis) and the output voltage of the water level sensor 14 (horizontal axis) according to the first embodiment.

As shown in FIG. 2A, the drainage system 13 includes the gas-liquid separator 20 and the water tank 21 including a metal housing. The gas-liquid separation unit 20 receives anode exhaust, which is fluid including hydrogen and generated water, from the fuel cell stack 2. The gas-liquid separation unit 20 separates the liquid water and the gas component from each other. The liquid water is dropped into the water tank 21, and hydrogen gas mixed with water vapor is discharged from the gas-liquid separation unit 20.

An upper portion 22 of the water tank 21 is structured as a large-diameter portion having a larger volume and a larger horizontal cross sectional area (second cross sectional area) than those of a lower portion 24. The lower portion 24 of the water tank 21 is structured as a small-diameter portion having a smaller volume and a smaller horizontal cross sectional area (first cross sectional area) than those of the upper portion. The upper portion 22 and the lower portion 24 may be connected to each other with a tapered portion 23 having a diameter that gradually decreases as it approaches the lower portion 24. However, the structure between the upper portion 22 and the lower portion 24 is not limited to this embodiment.

The lower portion 24 has an outlet 25 through which the water is discharged from the water tank 21. The outlet 25 is connected to the drain valve 15 with a drainpipe 26.

The water tank 21 has the water level sensor 14 for detecting the water level. In the first embodiment, the water level sensor 14 is a capacitance type water level sensor. The capacitance type water level sensor 14 outputs an analog signal representing the water level detected by the capacitance between the electrodes since the capacitance between the electrodes varies in accordance with the water level due to the difference between the dielectric constant of the air (about 1) and the dielectric constant of the liquid water (about 81).

A positive electrode 27 is a metal body, which is fixed to and insulated from a lid 30 of the water tank 21 such that the positive electrode 27 extends downward from the lid 30 into the water tank 21. The positive electrode 27 functions as one of the electrodes of the water level sensor 14. The water level sensor 14 detects a voltage that is proportional to the capacitance between the positive electrode 27 at the center of the water tank 21 and an inner wall 40 of the water tank 21 made of metal. The inner wall 40 of the water tank 21 functions as the ground electrode (negative electrode), that is, the other electrode of the water level sensor 14. Thus, the water level is detected as shown in FIG. 2B.

While the fuel cell system is in an operational state, the control device 17 opens and closes the drain valve 15 so that the water level is positioned between the upper limit and the lower limit thereof shown in FIG. 2A. More specifically, the control device 17 opens the drain valve 15 when the water level in the water tank 21 detected by the water level sensor 14 is above the upper limit thereof, and closes the drain valve 15 when the water level is below the lower limit thereof. Accordingly, while the fuel cell system is in operation, the water level is maintained between the upper limit and the lower limit thereof, which are both provided in the upper portion 22 of the water tank 21. As a result, in the case where the output level of the fuel cell stack 2 is high and the amount of water generated per unit time is increased, even if a large amount of liquid water suddenly flows into the gas-liquid separator 20, the water can be received by the upper portion 22 of the water tank 21 which has a large volume and a large cross sectional area. Therefore, the liquid water can be prevented from overflowing from the water tank 21, returning to the fuel gas separator 20 or the fuel cell 2, and blocking the supply of the fuel gas.

When the operation of the fuel cell system is in a stopped state, the control device 17 opens the drain valve 15 to drain the water from the water tank 21, and then closes the drain valve 15 when the water level reaches the stopped state water level. The stopped state water level is in the lower portion 24 of the water tank 21. Accordingly, when the operation of the fuel cell system is stopped, the water level is maintained at the lower portion 24, that is, at the small-diameter portion of the water tank having a small volume and a small cross sectional area. Thus, even if the outside temperature is below freezing and the liquid water in the water tank is frozen, the amount of ice to be melted is minimized. As a result, the time required for melting the ice can be minimized.

In addition, the ice is positioned at the water level sensor unit 14. Therefore, an accurate water level can be detected and accurate water level control can be performed immediately when the ice is melted. As a result, the vehicle can be started quickly.

In addition, water constantly remains in the water tank 21 irrespective of whether the fuel cell system is in the operational state, is being stopped, or is in the stopped state. Therefore, the fuel gas, which is flammable, is prevented from being discharged out of the drainage system 13 through the drain valve 15.

In the above-described embodiment, the upper portion 22 of the water tank 21 has a larger volume and a larger cross sectional area than those of the lower portion 24. Therefore, while the fuel cell is in the operational state, even if the output level of the fuel cell 1 is high and a large amount of generated water suddenly flows into the water tank 21, the gas-liquid separation function can be maintained. In addition, when the fuel cell 1 is in the stopped state, the water is discharged until the water level reaches the lower portion 24 of the water tank 21 that has a small volume and a small cross sectional area. Thus, even when the water in the water tank 21 freezes, the amount of water that freezes in the water tank 21 is small. Therefore, the time required for melting the ice can be reduced and the draining process can be started quickly.

In the present embodiment, the water tank 21 includes the upper portion 22, which is the large-diameter portion of the water tank 21 that has a large volume and a large cross sectional area, and the lower portion 24, which is the small-diameter portion of the water tank 21 that has a small volume and a small cross sectional area. However, the shape of the horizontal cross sectional area of the water tank 21 is not limited to circular, and effects similar to those of the present embodiment can, of course, also be obtained even when the cross sectional area is in another form such as elliptical or rectangular, as long as the volume and cross sectional area of the upper portion 22 of the water tank 21 are larger than those of the lower portion 24 of the water tank 21.

Second Embodiment

A second embodiment of the present invention will now be described. The overall structure of a fuel cell system according to the second embodiment is similar to that of the first embodiment shown in FIG. 1. FIG. 3 is a sectional view illustrating a drainage system 13 according to the second embodiment.

The second embodiment differs from the first embodiment in that a separation wall 28 is disposed in the water tank 21, having a hole 29 that allows fluid communication with the water tank 21. The separation wall 28 serves as the ground electrode (negative electrode) of the water level sensor 14 in the upper portion 22 of the water tank 21. The positive electrode 27 functions as a common positive electrode for both of the ground electrodes (negative electrodes) served by the separation wall 28 in the upper portion 22 of the water tank 21 and the inner wall of the water tank 21 in the lower portion 24 of the water tank 21. Other structures of the second embodiment are similar to those of the first embodiment.

The separation wall 28 is fixed to the lid 30 of the water tank 21 such that the separation wall 28 extends downward from the lid 30 into the water tank 21. The separation wall 28 divides the inner space of the water tank 21 into two sections, with one section contained inside the separation wall 28, and the other section located outside the separation wall 28. The bottom end of the separation wall 28 is at a height corresponding to the tapered portion 23 of the water tank 21. The bottom end of the separation wall 28 is open so that the sections inside and outside the separation wall 28 fluidly communicate with each other at the bottom end of the separation wall 28. In addition, the communication hole 29 is formed at a position above the upper limit of the water level in the separation wall 28 and allows the sections inside and outside the separation wall 28 to fluidly communicate with each other. The positive electrode 27 of the water level sensor 14 is disposed inside the separation wall 28. A bottom end portion of the positive electrode 27 extends to below the stopped state water level, which is at the lower portion 24 of the water tank 21. In the present embodiment, the separation wall 28 in the upper portion 22 of the water tank 21 and the inner wall of the water tank 21 in the lower portion 24 of the water tank 21 are used as the ground electrodes of the capacitance type water level sensor 14.

Thus, according to the present embodiment, the separation wall 28 is provided in the water tank 21, and the water level in the water tank 21 is detected on the basis of the capacitance between the separation wall 28 and the positive electrode 27 disposed at the center of the separation wall 28. Therefore, even when, for example, the vehicle in which the fuel cell system is mounted rocks or tilts and the water level suddenly becomes inclined in the water tank 21, movement of the water surface inside the separation wall 28 can be suppressed compared to the case in which no separation wall 28 is provided. Therefore, the water level at the center of the water tank 21 can be accurately detected.

Third Embodiment

Figure 4:
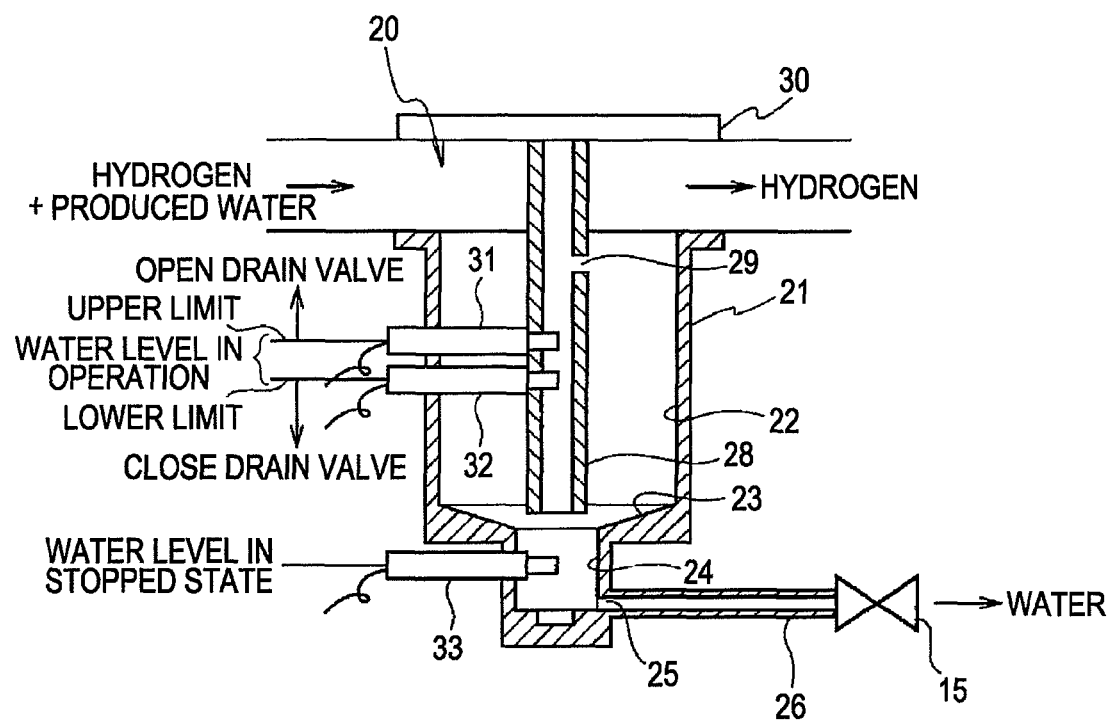
FIG. 4 is a sectional view illustrating a drainage system according to a third embodiment.

A third embodiment of the present invention will now be described. The overall structure of a fuel cell system according to the third embodiment is similar to that of the first embodiment shown in FIG. 1. FIG. 4 is a sectional view illustrating a drainage system 13 according to the third embodiment.

The third embodiment differs from the first embodiment in that a separation wall 28 is disposed in the water tank 21. A hole 29 that allows fluid communication with the water tank 21 is additionally provided in the water tank 21. An upper limit level sensor 31, a lower limit level sensor 32, and a stopped state level sensor 33 are provided in place of the capacitance type water level sensor 14 that continuously detects the water level. Other structures of the third embodiment are similar to those of the first embodiment.

The separation wall 28 is fixed to the lid 30 of the water tank 21 such that the separation wall 28 extends downward from the lid 30 into the water tank 21. The separation wall 28 divides the inner space of the water tank 21 into two sections, with one section contained inside the separation wall 28, and the other section located outside the separation wall 28. The bottom end of the separation wall 28 is at a height corresponding to the tapered portion 23 of the water tank 21. The bottom end of the separation wall 28 is open so that the sections inside and outside the separation wall 28 fluidly communicate with each other at the bottom end of the separation wall 28. In addition, the communication hole 29 is formed at a position above the upper limit of the water level in the separation wall 28 and allows the sections inside and outside the separation wall 28 to fluidly communicate with each other. The upper limit level sensor 31 and the lower limit level sensor 32 extend through the water tank 21 and the separation wall 28. In addition, the stoppage level sensor 33 is disposed at the height of the stopped state water level, which is set in the lower portion 24 of the water tank 21.

The upper limit level sensor 31, the lower limit level sensor 32, and the stopped state level sensor 33 are, for example, optical level sensors. Each level sensor 31, 32, 33 outputs a binary signal representing whether the fluid that exists at the detection position is air or water. The level sensors 31, 32, 33 are also referred to as level switches. The control device 17 performs similar to that in the first embodiment except the drain valve 15 is controlled on the basis of three binary signals output from the upper limit level sensor 31, the lower limit level sensor 32, and the stoppage level sensor 33 in the present embodiment, whereas a continuous water level signal is used in the first embodiment.

In the present embodiment, the water level within the separation wall 28 is detected by the level sensors in the upper portion 22 of the water tank 21. Therefore, even when, for example, the vehicle in which the fuel cell system is mounted rocks or tilts, the water level at the center of the water tank 21 can be accurately detected.

Fourth Embodiment

Figure 5A:
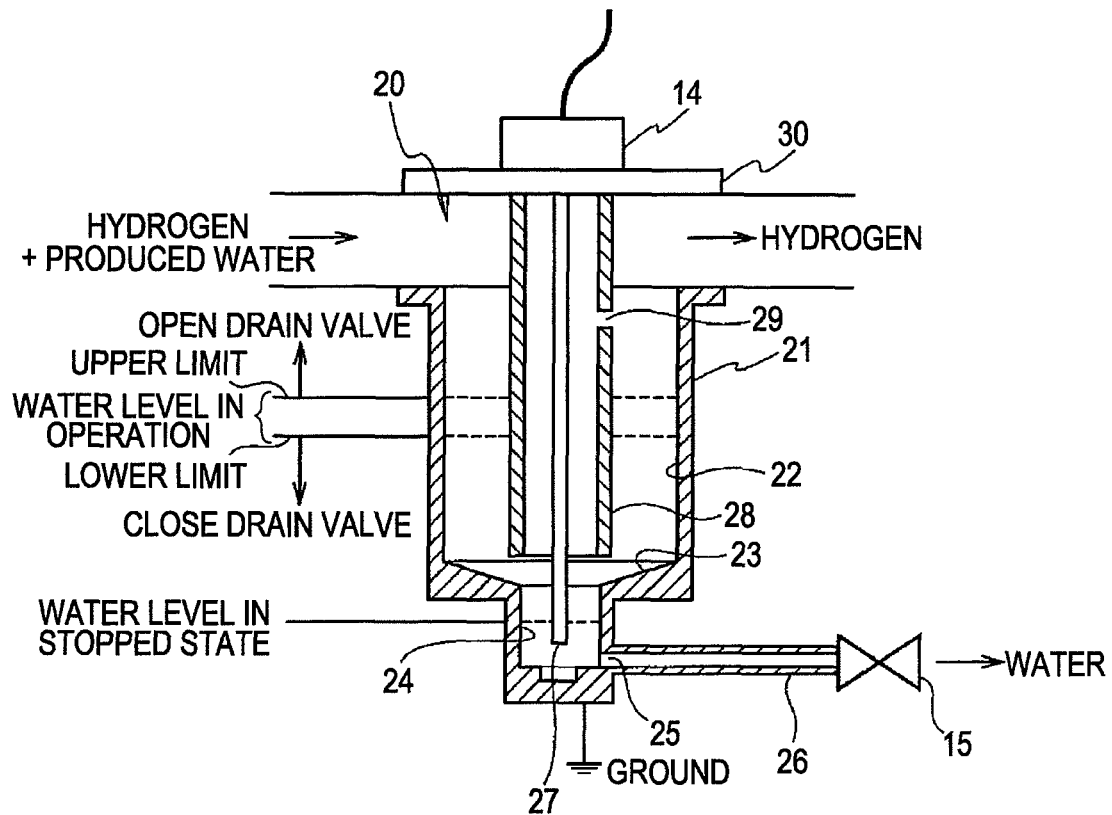
FIG. 5A is a sectional view illustrating a drainage system according to a fourth embodiment.
Figure 5B:
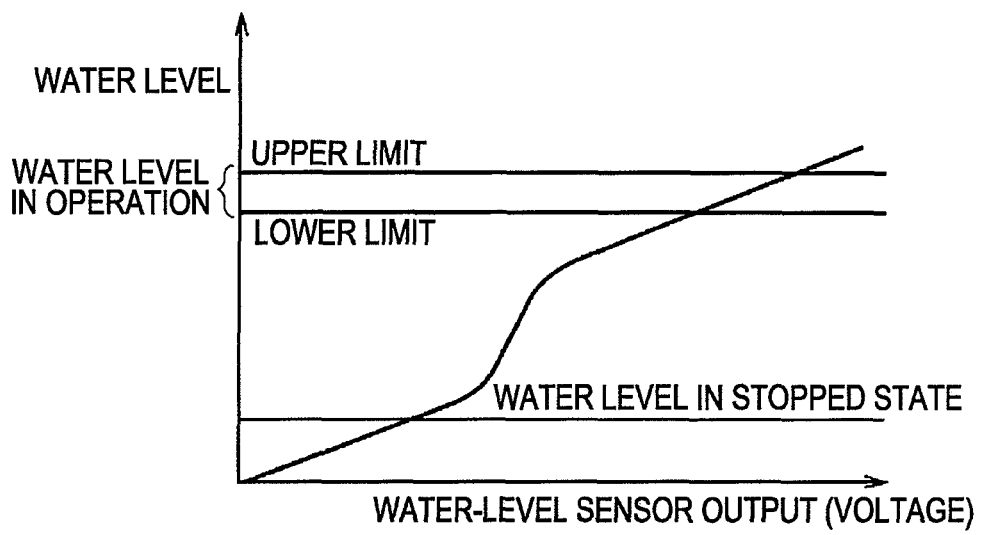
FIG. 5B is a graph illustrating the relationship between the water level and the water-level-sensor output voltage according to the fourth embodiment.

A fourth embodiment of the present invention will now be described. The overall structure of a fuel cell system according to the fourth embodiment is similar to that of the first embodiment shown in FIG. 1. FIG. 5A is a sectional view illustrating the drainage system 13 according to the fourth embodiment. FIG. 5B is a graph illustrating the relationship between the water level (vertical axis) and the output voltage of the water level sensor 14 (horizontal axis) according to the fourth embodiment.

The fourth embodiment differs from the first embodiment in that a separation wall 28 is disposed in the water tank 21 having a hole 29 that allows fluid communication with the water tank 21. The separation wall 28 serves as the ground electrode (negative electrode) of the water level sensor 14 in the upper portion 22 of the water tank 21.

The separation wall 28 is fixed to the lid 30 of the water tank 21 such that the separation wall 28 extends downward from the lid 30 into the water tank 21. The separation wall 28 divides the inner space of the water tank 21 into two sections, with one section contained inside the separation wall 28, and the other section located outside the separation wall 28. The bottom end of the separation wall 28 is at substantially the same height as the bottom end of the upper portion 22 of the water tank 21. The bottom end of the separation wall 28 is open so that the sections inside and outside the separation wall 28 fluidly communicate with each other at the bottom end of the separation wall 28. In addition, the communication hole 29 is formed at a position above the upper limit of the water level in the separation wall 28 and allows the sections inside and outside the separation wall 28 to fluidly communicate with each other. The positive electrode 27 of the water level sensor 14 is disposed inside the separation wall 28. A bottom end portion of the positive electrode 27 extends to below the stopped state water level, which is at the lower portion 24 of the water tank 21. In the present embodiment, the separation wall 28 in the upper portion 22 of the water tank 21, and the inner wall of the water tank 21 in the lower portion 24 of the water tank 21 are used as the ground electrodes of the capacitance type water level sensor 14.

In addition, according to the present embodiment, the dimensions are set such that the inner diameter of the separation wall 28 is equal to the inner diameter of the lower portion 24 of the water tank 21. Therefore, in the relationship between the voltage of the water level sensor 14 and the water level according to the present embodiment shown in FIG. 5B, the rate of change in the output voltage of the water level sensor 14 is high with respect to the unit change in the water level in the operational state and the stopped state. Therefore, the control device 17 can easily perform water-level control.

Fifth Embodiment

Figure 6A:
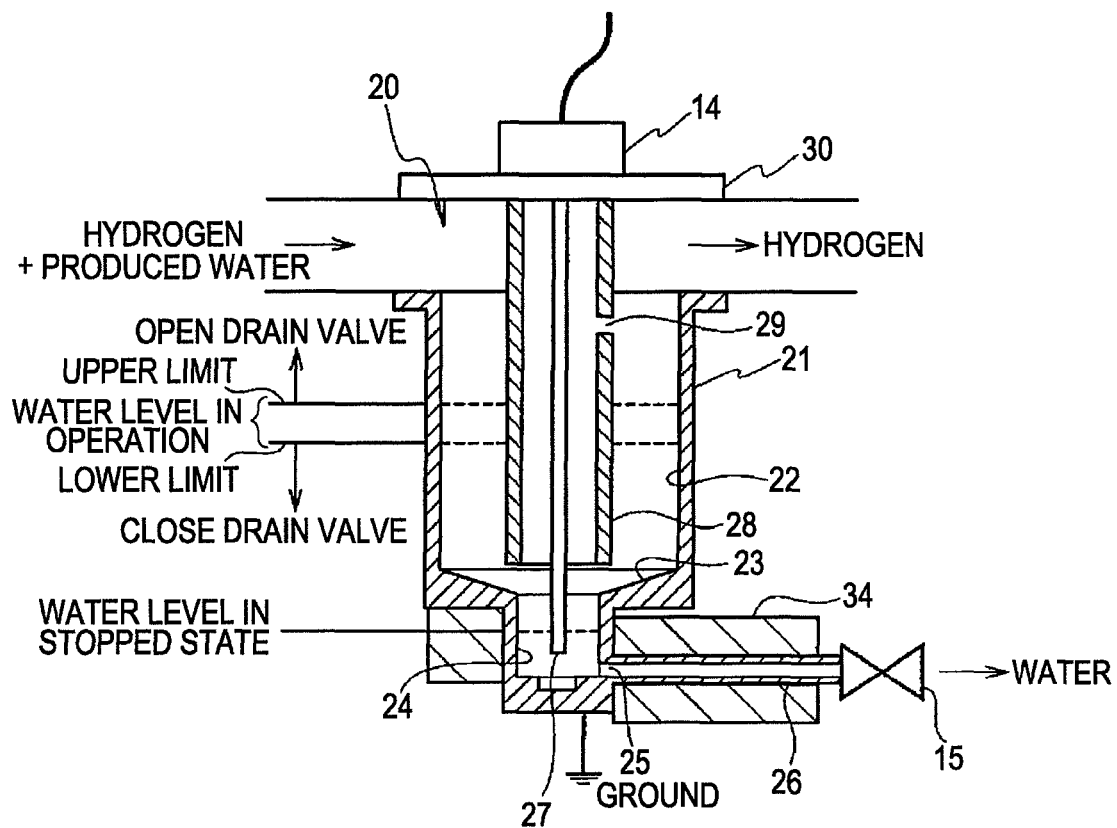
FIG. 6A is a sectional view illustrating a drainage system according to a fifth embodiment.
Figure 6B:
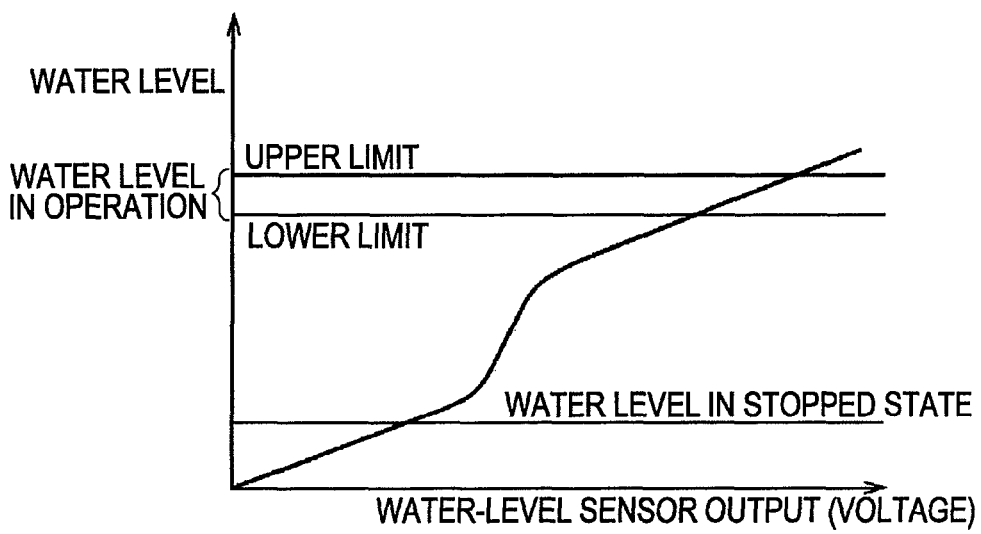
FIG. 6B is a graph illustrating the relationship between the water level and the water-level-sensor output voltage according to the fifth embodiment.

A fifth embodiment of the present invention will now be described. The overall structure of a fuel cell system according to the fifth embodiment is similar to that of the first embodiment shown in FIG. 1. FIG. 6A is a sectional view illustrating a drainage system 13 according to the fifth embodiment. FIG. 6B is a graph illustrating the relationship between the water level (vertical axis) and the output voltage of the water level sensor 14 (horizontal axis) according to the fifth embodiment.

The fifth embodiment differs from the fourth embodiment in that a heater 34, such as a radiator, for heating the lower portion 24 of the water tank 21 and the drainpipe 26, is additionally provided. Other structures of the fifth embodiment are similar to those of the fourth embodiment. The heater 34 may also include portions for heating the lower portion 24 of the water tank 21 from the inside. In addition, the heater 34 is not limited to the radiator, and may also be a circulating heated medium in an area surrounding the lower portion 24 of the water tank 21.

The control device 17, supplies electricity to the heater 34 when the water in the lower portion 24, that is, in the small-diameter portion of the water tank 21, is frozen. Thus, the ice in the smaller portion 24 and the drainpipe 26 can be melted.

According to the present embodiment, since the heater 34 for heating the lower portion 24 of the water tank 21 is provided, the inner wall of the water tank 21, which functions as the ground electrode (negative electrode) of the water level sensor 14, can be directly heated. Thus, even when the water in the water tank 21 freezes while the fuel cell system 1 is in the stopped state, the time required for melting the ice can be minimized.

Sixth Embodiment

Figure 7A:
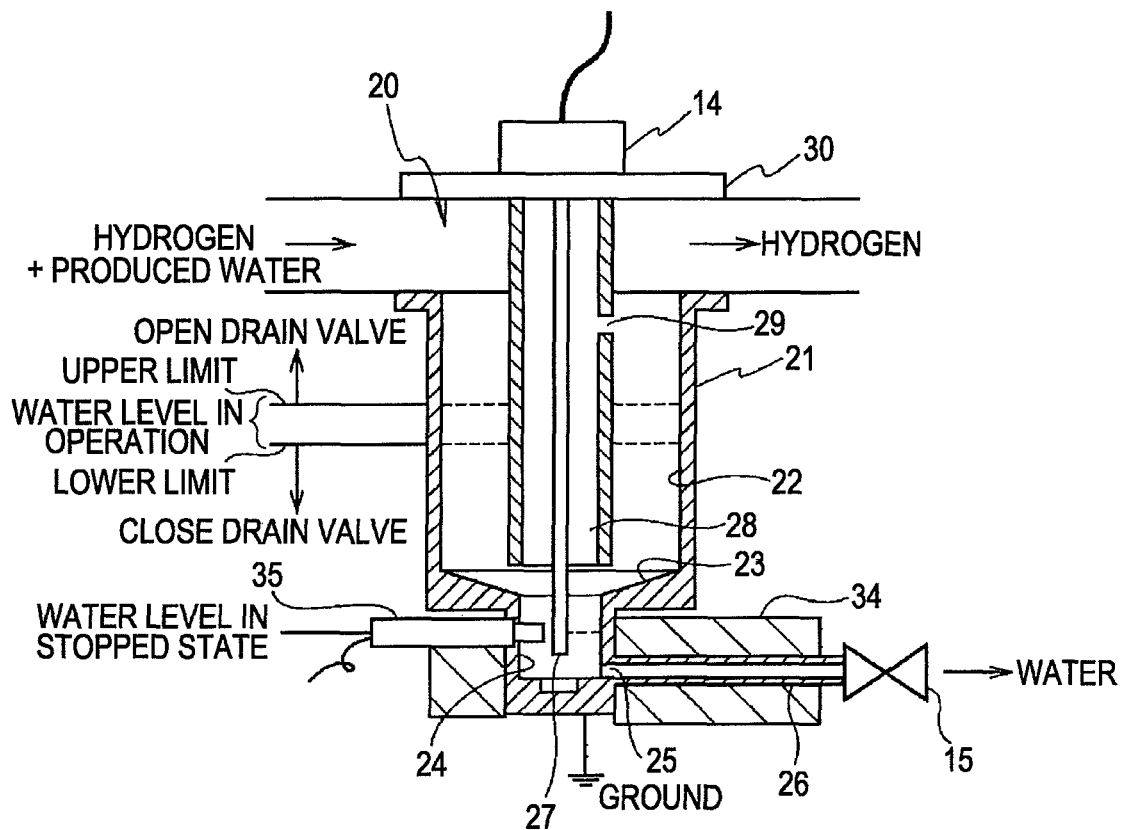
FIG. 7A is a sectional view illustrating a drainage system according to a seventh embodiment.
Figure 7B:
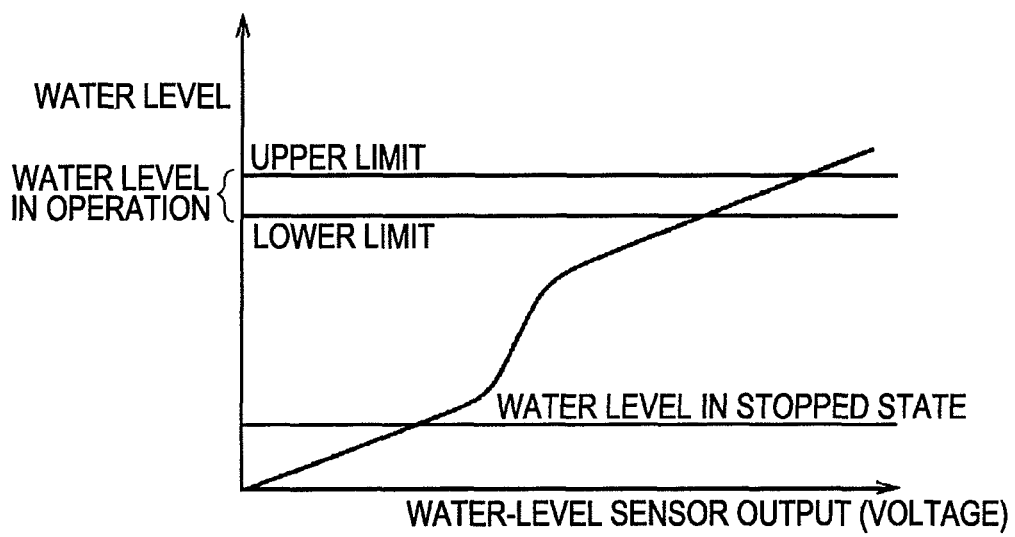
FIG. 7B is a graph illustrating the relationship between the water level and the water-level-sensor output voltage according to the seventh embodiment.

A sixth embodiment of the present invention will now be described. The overall structure of a fuel cell system according to the sixth embodiment is similar to that of the first embodiment shown in FIG. 1. FIG. 7A is a sectional view illustrating a drainage system 13 according to the sixth embodiment. FIG. 7B is a graph illustrating the relationship between the water level (vertical axis) and the output voltage of the water level sensor 14 (horizontal axis) according to the sixth embodiment.

The sixth embodiment differs from the fifth embodiment in that a temperature sensor 35 is additionally provided on the inner wall of the lower portion of the water tank 21. A detection signal obtained from the temperature sensor 35 is input to the control device 17. Other structures of the sixth embodiment are similar to those of the fifth embodiment shown in FIGS. 6A and 6B.

Next, the operation according to the present embodiment will be described. When the fuel cell is activated, the control device 17 accurately determines whether or not the water in the lower portion 24 of the water tank 21 is frozen by detecting the temperature of the inner wall of the lower portion 24 of the tank with the temperature sensor 35. The control device 17 decides whether to supply electricity to the heater 34 to start heating the water tank 21 and the drain tube 26 upon activation based on the determination of whether the water is frozen. When the electricity is supplied, the time at which the supply of electricity is to be stopped can be accurately determined based on the temperature detected by the temperature sensor 35.

As an example of the determination, it is determined that at least a portion of the water is frozen if the temperature is 2° C. or less. In such a case, electricity is supplied to the heater 34. Then, if the temperature detected by the temperature sensor 35 is increased to, for example, 5° C., it is determined that the ice is melted. Thus, the supply of electricity to the heater 34 is stopped and the drain valve 15 can be opened. Then, the drain valve 15 is opened when the water level in the water tank 21 becomes higher than the upper limit thereof.

In the present embodiment, when the fuel cell system is activated, it can be accurately determined whether the water in the water tank 21 is frozen, that is, whether to supply electricity to the radiator that functions as the heater 34. Therefore, power consumption of the heater 34 can be minimized.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A drainage system for a fuel cell, comprising:
   a gas-liquid separator configured to separate fuel gas and liquid water from a gas-liquid mixture discharged from the fuel cell;
   a water tank configured to receive the liquid water separated by the gas-liquid separator;
   a water-level detector provided in the water tank, the water-level detector including an upper limit detector, a lower limit detector, and a stopped state level detector;
   a drain valve in fluid communication with the water tank, the drain valve configured to selectively discharge the liquid water from the water tank; and
   a control unit configured to selectively open and close the drain valve,
   wherein the water tank includes a lower portion having a first horizontal cross sectional area and an upper portion having a second horizontal cross sectional area, the first horizontal cross sectional area being smaller than the second horizontal cross sectional area,
   wherein the control unit is configured to open and close the drain valve to maintain a first water level within the upper portion of the water tank when the fuel cell is in an operating state and to maintain a second water level within the lower portion of the water tank when the fuel cell is in a stopped state, and
   wherein the upper and lower limit level detectors are provided in the upper portion of the water tank and define the first water level, and the stopped state level detector is provided in the lower portion of the water tank and defines the second water level.

2. The drainage system according to claim 1, further comprising:
   a heater configured to heat the water tank by applying heat to the lower portion of the water tank.

3. The drainage system according to claim 2, further comprising:
   a temperature detector located within the lower portion of the water tank,
   wherein the control unit activates and deactivates the heater based on a temperature detected by the temperature detector.

4. A drainage system for a fuel cell, comprising:
   a gas-liquid separator configured to separate fuel gas and liquid water from a gas-liquid mixture discharged from the fuel cell;
   a water tank configured to receive the liquid water separated by the gas-liquid separator; a drain valve in fluid communication with the water tank, the drain valve configured to selectively discharge the liquid water from the water tank;
   a water-level detector configured to detect a water level in the water tank; and
   a control unit configured to selectively open and close the drain valve,
   wherein the water tank includes a lower portion having a first horizontal cross sectional area and an upper portion having a second horizontal cross sectional area, the first horizontal cross sectional area being smaller than the second horizontal cross sectional area, and
   wherein the control unit opens and closes the drain valve to maintain a first water level within the upper portion of the water tank when the fuel cell is in an operating state and to maintain a second water level within the lower portion of the water tank when the fuel cell is in a stopped state;

wherein the control unit opens and closes the drain valve in response to the water level detected by the water-level detector;

wherein the water-level detector is disposed in the water tank, and wherein the water tank includes a separation wall disposed within the water tank, the separation wall configured to surround at least a portion of the water-level detector.

5. The drainage system according to claim 4, wherein the water-level detector includes a capacitance type water level sensor having a ground electrode and a positive electrode, wherein the separation wall serves as the ground electrode in the upper portion of the water tank and a peripheral wall of the water tank serves as the ground electrode in the lower portion of the water tank, and wherein the positive electrode extends beyond a lower end of the separation wall and is common for both the upper portion and the lower portion of the water tank.

6. The drainage system according to claim 5, wherein the separation wall has a third horizontal cross sectional area which is equal to the first horizontal cross sectional area.

7. The drainage system according to claim 4, wherein the lower portion of the water tank defines a first volume, the upper portion of the water tank defines a second volume that is larger than the first volume, and a tapered portion connects the upper portion of the water tank to the lower portion of the water tank.

8. A drainage system for a fuel cell, comprising:

a gas-liquid separator configured to separate fuel gas and liquid water from a gas-liquid mixture discharged from the fuel cell;

a water tank configured to receive the liquid water separated by the gas-liquid separator;

a drain valve in fluid communication with the water tank, the drain valve configured to selectively discharge the liquid water from the water tank;

a control unit configured to selectively open and close the drain valve; and an upper threshold level sensor and a lower threshold level sensor provided in the upper portion of the water tank, wherein the water tank includes a lower portion having a first horizontal cross sectional area and an upper portion having a second horizontal cross sectional area, the first horizontal cross sectional area being smaller than the second horizontal cross sectional area;

wherein the control unit opens and closes the drain valve to maintain a first water level within the upper portion of the water tank when the fuel cell is in an operating state and to maintain a second water level within the lower portion of the water tank when the fuel cell is in a stopped state; and wherein the first water level within the upper portion of the water tank is maintained between the upper threshold level and the lower threshold level in the operational state.

9. A drainage system for a fuel cell, comprising:

gas-liquid separator means for separating fuel gas and liquid water from a gas-liquid mixture discharged from the fuel cell;

water storage means for receiving the liquid water separated by the gas-liquid separator means;

sensor means for detecting the level of water in the water storage means;

discharge means for selectively discharging the liquid water from the water storage means; and control means for selectively controlling the discharge means based on the level of water detected by the sensor means, wherein water storage means includes a lower portion having a first horizontal cross sectional area and an upper portion having a second horizontal cross sectional area, the first horizontal cross sectional area being smaller than the second horizontal cross sectional area, and wherein the control means, based on the level of water in the water storage means detected by the sensor means, controls the discharge means to maintain a first water level within the upper portion of the water storage means when the fuel cell is in an operating state and to maintain a second water level within the lower portion of the water storage means when the fuel cell is in a stopped state.

* * * * *